March 25, 1947.　　　　M. L. FAST　　　　2,418,019
CLUTCH AND BRAKE MECHANISM
Filed Feb. 17, 1944　　　　2 Sheets-Sheet 2
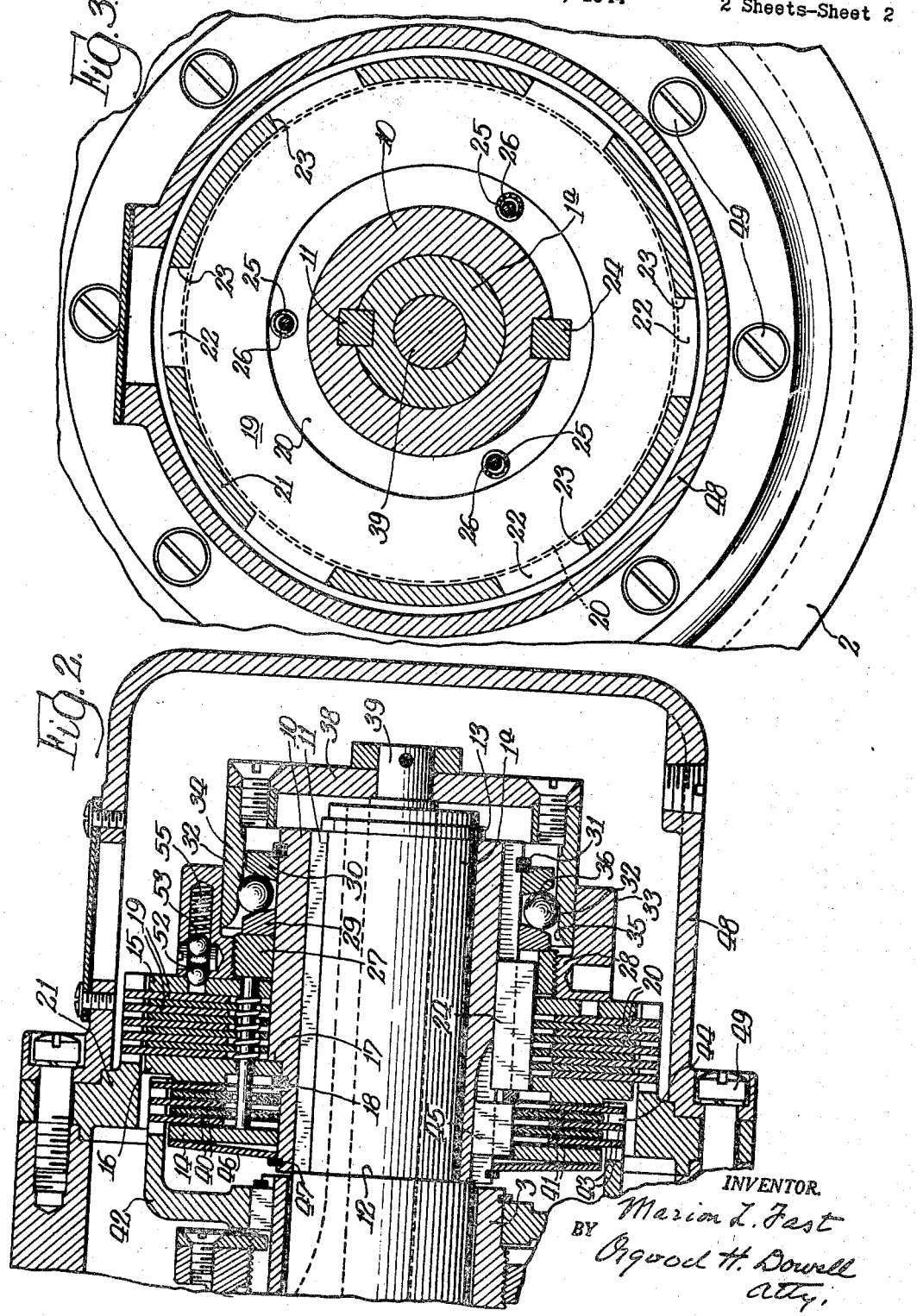

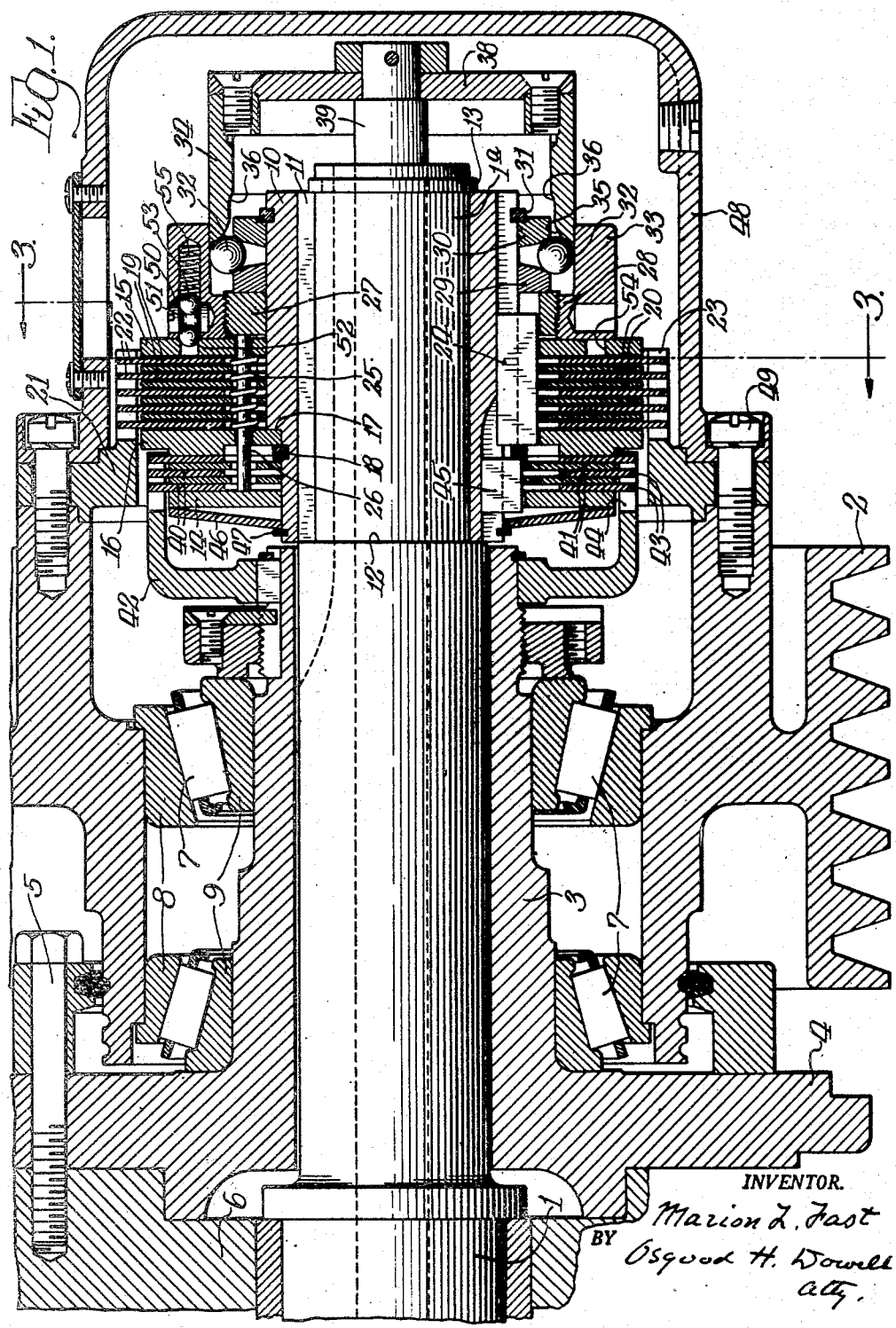

Patented Mar. 25, 1947

2,418,019

UNITED STATES PATENT OFFICE 2,418,019

CLUTCH AND BRAKE MECHANISM

Marion L. Fast, South Bend, Ind., assignor to Dodge Manufacturing Corporation, Mishawaka, Ind., a corporation of Indiana Application February 17, 1944, Serial No. 522,704

4 Claims. (Cl. 192—18)

This invention relates to clutches, more particularly of the type comprising alternatively operable clutch and brake mechanisms.

An object of the invention is to provide such a device of practicable and advantageous character for use as a combined clutch and brake, i. e., for connecting a shaft or other rotatable machine element to a rotating member from which it is to be driven, and for automatically braking such shaft or driven element upon release of its clutch connection with the driving member.

The invention will be best understood by reference to an illustrative embodiment thereof shown in the accompanying drawings. In said drawings, a combined clutch and brake embodying the invention in one practicable form is shown installed in one practicable type of drive unit.

For convenience, the term "clutch mechanism" will be used only with reference to mechanism to be actuated for frictionally clutching the driven member to the driving member, while the mechanism to be actuated for the braking function will be referred to as the "brake mechanism."

Fig. 1 of the drawings is a longitudinal section of the illustrative structure, the clutch mechanism thereof being shown in open or release condition, and the brake mechanism being in closed or braking condition.

Fig. 2 is a similar enlarged view of a part of said structure including the combined brake and clutch device, the clutch mechanism thereof being closed or in clutching condition and the brake mechanism thereof being open or in release condition.

Fig. 3 is a cross-section taken on the line 3—3 of Fig. 1, looking in the direction of the arrows.

In the drawings, 1 denotes a shaft which is to be clutched to and driven from a pulley 2, the latter to be belt-driven from a motor-driven pulley (not shown). As shown, said pulley 2 is mounted on a stationary tubular stub axle 3 through which passes a spindle-like extension of the shaft, said stub axle being an integral part of a member 4 interfitted with and rigidly bolted by attaching bolts 5 to a side member 6 of a machine frame in which the shaft is mounted. An antifriction bearing for the pulley is provided by annular trains of bearing rollers 7 running in cup rings 8 fitted in the pulley hub and on cone rings 9 fitted on said stub axle.

Fixed on the projecting stub portion 1ª of the shaft spindle is a sleeve 10 constituting a clutch hub, said hub being in driving connection with the spindle through a key 11. A shoulder on the spindle in abutting relation to one end of the hub is indicated at 12. A thrust shoulder in abutting relation to the other end of the hub is provided by a split contractile ring 13 seated in an annular groove in the spindle.

Carried by the hub 10 in driving connection therewith are axially movable clamping plates 14 and 15 and an intermediate clamping plate 16 which is in fixed relation to the hub, said plate 16 being fitted between a hub shoulder 17 and a shoulder provided by a split contractile ring 18 seated in an annular groove in the hub.

The plate 15 is cooperable with the plate 16 for clamping interposed friction disc means comprising in this instance a plurality of friction discs 19 and intermediate discs or plates 20, the discs 19 being carried by and in driving connection with the pulley and the discs 20 being carried by and in driving connection with the clutch hub. Attached to and rotating with the pulley is a driving bell 21 enclosing and holding said discs 19 which are shown having outwardly projecting lugs 22 slidably fitted in keyways 23 in said driving bell. The intermediate discs 20 as well as the clamping plate 15 are slidable on the hub and suitably keyed thereto, as by means of a key 24 fitted in a longitudinal groove in the hub and in keyways or notches therefor in said plate 15 and intermediate discs 20.

The assembly comprising the axially fixed clamping plate 16, the axially movable clamping plate 15, and the interposed friction discs 19 and 20, constitutes a normally open clutch mechanism for connecting the shaft 1 to the pulley 2 by which it is to be driven. Said driving clutch mechanism is normally maintained open or in release condition by a plurality of clutch-releasing springs 25 arranged at suitably angularly spaced intervals, these being coiled springs compressed between and reacting against said clamping plates 15 and 16 and yieldingly urging the plate 15 in a direction away from the plate 16. Longitudinal rods 26 enclosed by the springs prevent them from buckling. In the specific construction shown, the springs 25 are arranged inwardly from the inner peripheries of the friction discs 19 and pass through holes therefor in the intermediate discs 20. If desired, said holes may be of slightly less diameter than the outside diameter of the springs, which are threaded through the intermediate discs, resulting in a slightly eccentric relation of said springs to said holes and a bearing of successive convolutions of the springs against the successive discs 20. With this arrangement, the springs 25 not only force the clamping plates 15 and 16 apart when clutching pressure is released therefor, but also assure spreading of the intermediate discs or plates 20.

The specific means embodied in the illustrative construction for closing the clutch mechanism is as follows: Behind the axially movable clamping plate 15 is an axially movable annular thrust-transmitting member 27 carrying in screw-threaded engagement therewith an adjusting ring 28 which said clamping plate 15 abuts. In the release condition of said driving clutch mechanism, said clamping plate 15 is maintained in abutting relation to said member by the pressure of the clutch-releasing springs 25. Said member 27 is slidable on the clutch hub and keyed thereto by the key 24 engaging a keyway in said member. Loosely fitted on the hub behind said member 27 are a pair of hardened metal rings or washers 29 and 30, one abutting said member 27 and the other abutting an axially fixed thrust sustaining shoulder provided by a split contractile ring 31 engaging an annular groove in the hub. These hardened rings or washers 29 and 30 have their confronting faces diverging outwardly and engaged by a plurality of steel balls 32 arranged in an annular series. There may be a full complement of such balls, in no greater number than can be forced radially inward to the position shown in Fig. 2, or there may be less than a full complement of such balls suitably spaced by suitable spacing means. In the release condition of the clutch mechanism, the force of the springs 25, transmitted through the adjusting ring 28 and axially movable thrust-transmitting member 27, presses the ring 29 rearwardly or toward the ring 30, thereby forcing the balls 32 outwardly against a surrounding annular member provided in this instance by a flange 33 projecting rearwardly from the adjusting ring 28. Associated with said balls is an axially shiftable cam sleeve 34 operatively connected with suitable means for shifting it. In the open or release condition of the driving clutch mechanism, the cam sleeve 34 is in the retracted position shown in Fig. 1. When the cam sleeve is forced forwardly from such retracted position, its wedge-like fore end enters between the flange 33 and annular series of balls 32, and by coaction of the internal cam surface 35 of said sleeve with the balls they are forced inwardly, thereby spreading the rings 29 and 30 or forcing the ring 29 in a direction away from the ring 30. The thrust thus exerted is transmitted through the axially movable member 27 and adjusting ring 28 to the clamping plate 15, forcing it toward the plate 16 to effect clutching by the clamping of the friction discs 19 and 20 between the clamping plates 15 and 16. Forward movement of the cam sleeve 34 may be limited by engagement with the balls of a stop shoulder 36 in said cam sleeve.

According to the specific construction shown, the cam sleeve 34 is rigidly attached to and carried by a longitudinally disposed shift rod 39 which may be guided in any suitable manner and operated by any suitable means. As shown the shift rod is arranged and guided in a bore of the shaft 1, the latter being tubular. The shift rod may extend clear through the tubular shaft and protrude beyond the opposite end thereof from that carrying the described clutch and brake, and may have its protruding end equipped with an operating knob or connected with an operating lever. Instead of this arrangement, the cam sleeve could be slidably and rotatably mounted on the clutch hub or an extension thereof and equipped with a swiveled collar operatively connected with a clutch throw lever, as in the case of a similar cam sleeve for a similar clutch disclosed in my co-pending patent application Serial No. 520,469.

The clamping plates 14 and 16 are cooperable for clamping or squeezing a set of friction discs 40 and intermediate friction discs or plates 41, the discs 40 being held against rotative movement and the discs 41 being carried by and in driving connection with the clutch hub. Fixed on the stationary tubular stub axle 3 is a stationary bell 42 holding the discs 40 which are formed with outwardly projecting lugs 43 slidably fitted in longitudinal keyways or slots 44 in said stationary bell. The intermediate discs 41 as well as the axially movable clamping plate 14 are slidable on the clutch hub and suitably keyed thereto as by means of the key 45 fitted in the aforesaid hub groove and in keyways or notches in said plate 14 and discs 41.

The assembly comprising the clamping plates 14 and 16 and interposed friction discs 40 and 41 constitutes a brake mechanism which is normally closed by spring pressure against the axially movable clamping plate 14 in a direction for forcing it toward the axially fixed plate 16. Such spring pressure is advantageously applied by means of a so-called Belleville spring 46 consisting of an unsplit conical washer of spring steel or resilient metal, fitted on the clutch hub between the plate 14 and an axially fixed abutment provided by a split contractile ring 47 seated in an annular groove in its hub; said washer having its inner edge portion abutting said ring 47 and its outer edge portion bearing against the plate 14, and the washer being stressed so that it exerts a spring pressure against the plate 14 for normally maintaining the elements of the brake mechanism in frictional engagement. Instead of the conical spring washer shown, a similarly arranged spring washer of concavo-convex form could be employed.

For opening the brake mechanism simultaneously with the closing of the driving clutch mechanism, the longitudinally disposed rods 26 enclosed by the clutch-releasing springs 25 are utilized as thrust-transmitting means, said rods being slidable through the clamping plates 15 and 16 and arranged with their fore ends abutting the clamping plate 14 and their rear ends abutting the axially movable thrust-transmitting member 27; whereby movement of said member 27 in a direction to force the clamping plate 15 toward the plate 16 is transmitted through the axially movable rods 26 to the clamping plate 14 to force it in a direction away from the plate 16.

The operation of the device will be readily apparent. In the open or release condition of the driving clutch mechanism, the cam sleeve 34 is in the retracted position shown in Fig. 1. In this condition of the driving clutch mechanism, the brake mechanism is maintained closed by the pressure of the Belleville spring 46 against the axially movable clamping plate 14. To close or apply the driving clutch mechanism, the cam sleeve 34 is forced forward, thereby forcing the balls 32 inwardly between the rings 29 and 30 and thus exerting thrust which is transmitted through the member 27 and adjusting ring 28 to the axially movable clamping plate 15, forcing said plate 15 toward the plate 16 to clamp the interposed friction discs 19 and 20. In this operation, the axial movement of the member 27 toward the plate 16 is transmitted through the rods 26 to the clamping plate 14, forcing it in a direction away from the plate 16. Thus the pulley 2 becomes clutch-connected to the shaft 1, while simultaneously with the closing of the driving clutch mechanism the brake mechanism is released. To release the driving clutch mechanism, the cam sleeve is retracted to the position shown in Fig. 1, whereupon the pressure of the clutch releasing springs 25 against the clamping plate 15 forces it in a direction away from the plate 16, the movement of said plate in said direction being transmitted through the adjusting ring 28 and its carrying member 27 to the thrust ring 29, forcing the balls 32 outwardly. Simultaneously with such release operation of the driving clutch mechanism, the pressure of the Belleville spring 46 against the clamping plate 14 forces it toward the plate 16 to effect clamping of the interposed friction discs 40 and 41, thus automatically braking the shaft as it is released from clutch connection with the pulley 3 from which it is driven.

Among other advantages, the braking is effected by mechanism the frictional braking elements of which are yieldingly maintained in frictional engagement by spring action; the means for exerting spring pressure on the braking mechanism is quite simple; and the organization comprising the combined clutch and brake mechanisms is very compact, as well as practicable and efficient.

In the drawings, the member designated by the reference numeral 48 is a hood, shown bolted to the pulley 3 by the same bolts or screws 49 which attach the driving bell 21.

So much of the illustrative structure as comprises the driving clutch mechanism together with the thrust-exerting means operable for forcing the frictional clutching elements thereof into engagement, is generally similar to a clutch disclosed in my copending application Serial No. 520,469, and embodies features of improvement claimed in that application.

There is also shown in the drawings a means for locking the adjusting ring 28 in adjusted angular relation to the clamping plate 15, which locking means is the subject of my copending application Serial No. 520,470. This is briefly described as follows: In the adjusting ring 28 is a rotatable pin 50 having an eccentric annular groove 51 engaged by a pair of balls 52 and 53 arranged at opposite sides of the pin and movable transversely thereof in a bore perpendicular to the abutment face of said adjusting ring and having an open end in said face. In the clamping plate 15 are keeper holes 54 arranged in an annular series and selectively registrable with said bore. In the locking position of the locking means shown in the drawings, the pin 50 engaging the ball 52 in the shallowest part of the groove 51 holds said ball in a protracted position, protruding into engagement with a registered keeper hole, while the ball 53 is yieldingly held by the spring 55 in frictional engagement with the pin in the deepest part of said groove, thus preventing accidental turning of the pin from locking position. Upon turning the pin half way around, so that the ball 52 can be received in the deepest part of the groove 51, said ball can recede within the adjusting ring sufficiently for release of the locking means or to permit disengaging said ball 52 from the keeper hole by a rotative movement of the adjusting ring.

It will be understood that the invention is not limited to the particular form of embodiment shown and described.

I claim:

1. A combined clutch and brake comprising, in combination, normally open clutch mechanism for connecting coaxial rotary driving and driven members, normally closed brake mechanism for connecting said driven member to a stationary member, said brake mechanism comprising friction disc means and plates cooperable to clamp the same, a hub keyed to said driven member and carrying said plates in driving connection therewith and having an annular shoulder thereon, one of said plates being axially movable and the other axially fixed, a Belleville spring pressing said axially movable plate toward the other, said spring being a stressed resilient conical washer fitted on said hub with its inner edge portion abutting said shoulder and its outer edge portion abutting said axially movable plate, thrust-exerting mechanism operable for closing said first mentioned clutch mechanism, and means operable by said thrust-exerting mechanism for forcing said axially movable clamping plate in a direction away from said axially fixed clamping plate against the resistance of said spring.

2. A combined clutch and brake comprising, in combination, normally open clutch mechanism for connecting coaxial rotary driving and driven members, normally closed brake mechanism for connecting said driven member to a stationary member, each of said mechanisms comprising a pair of clamping plates and interposed friction disc means, there being three such clamping plates one of which is common to the two mechanisms, said one being axially fixed and between the other two clamping plates which are axially movable, an axially movable thrust-transmitting member in abutting relation to the axially movable clamping plate of said clutch mechanism, clutch releasing springs maintaining said abutting relation, means operable for closing said clutch mechanism by forcing said thrust-transmitting member toward said fixed clamping plate, spring means for forcing the axially movable clamping plate of said brake mechanism toward said fixed clamping plate, and axially movable thrust-transmitting rods arranged between and with their opposite ends abutting said thrust-transmitting member and said axially movable clamping plate of said brake mechanism.

3. A combined clutch and brake comprising, in combination, normally open clutch mechanism for connecting coaxial rotary driving and driven members, normally closed brake mechanism for connecting said driven member to a stationary member, each of said mechanisms comprising a pair of clamping plates and interposed friction disc means, there being three such clamping plates one of which is common to the two mechanisms, said one being axially fixed and between the other two clamping plates which are axially movable, means operable for closing said clutch mechanism by forcing the axially movable clamping plate thereof toward said fixed clamping plate, a Belleville spring forcing the axially movable clamping plate of said brake mechanism toward said fixed clamping plate, and means whereby the axially movable clamping plate of said brake mechanism is forced in a direction away from said fixed clamping plate when the axially movable clamping plate of said clutch mechanism is forced toward said fixed clamping plate.

4. In a driving and braking unit, the combination comprising a stationary tubular axle, a member rotatably mounted thereon, a shaft extending through and beyond said axle, a clutch hub fixed on the projecting stub portion of said shaft, a driving bell fixed to said member, clutch mechanism for connecting said hub and driving bell, a stationary bell fixed to said axle between said hub and the bearing for said member, brake mechanism for connecting said hub and stationary bell, each of said mechanisms comprising a pair of clamping plates and interposed friction disc means, there being three such plates one of which is common to the two mechanisms, said one being axially fixed and between the other two which are axially movable, means operable for closing said clutch mechanism, spring means for closing said brake mechanism, and means operable by the means for closing said clutch mechanism for opening said brake mechanism.

MARION L. FAST.

REFERENCES CITED

The following references are of record in the file of this patent:

UNITED STATES PATENTS

| Number | Name | Date |
| --- | --- | --- |
| 1,528,973 | Groene | Mar. 10, 1925 |
| 2,009,301 | Rode et al. | July 23, 1935 |
| 2,039,128 | Tiedemann | Apr. 28, 1936 |
| 2,183,000 | Wolfram | Dec. 12, 1939 |
| 2,209,776 | Kiekhaefer | July 30, 1940 |
| 2,213,111 | Strout | Aug. 27, 1940 |
| 2,242,396 | Johansen | May 20, 1941 |